United States Patent [19]

Brekner et al.

[11] Patent Number: 5,439,722
[45] Date of Patent: Aug. 8, 1995

[54] SUBSTRATE COMPOSED OF AT LEAST ONE CYCLOOLEFIN COPOLYMER FOR RECORDING MEDIA AND PROCESS FOR PRODUCING IT

[75] Inventors: Michael-Joachim Brekner, Frankfurt am Main; Thomas Weller, Mainz, both of Germany

[73] Assignee: Hoechst Aktiengesellschaft, Frankfurt am Main, Germany

[21] Appl. No.: 131,945

[22] Filed: Oct. 8, 1993

[30] Foreign Application Priority Data

Oct. 8, 1992 [DE] Germany .................. 42 33 851.4

[51] Int. Cl.⁶ .................................................. B32B 3/00
[52] U.S. Cl. .................................. 428/65.1; 428/913; 430/270; 430/945; 346/135.1
[58] Field of Search ............... 428/64, 65, 913, 220; 430/945; 546/76 L, 135.1; 524/504, 579; 525/185, 186, 187, 333.3, 384

[56] References Cited

U.S. PATENT DOCUMENTS

| | | | |
|---|---|---|---|
| 4,614,778 | 9/1986 | Kajiura et al. | 526/281 |
| 5,003,019 | 3/1991 | Ishimaru | 526/281 |
| 5,008,356 | 4/1991 | Ishimaru | 526/281 |
| 5,059,462 | 10/1991 | Kurisu et al. | 428/64 |
| 5,242,729 | 9/1993 | Hirata et al. | 428/64 |
| 5,302,656 | 4/1994 | Kohara et al. | 524/579 |

FOREIGN PATENT DOCUMENTS

| | | |
|---|---|---|
| 0283164 | 9/1988 | European Pat. Off. . |
| 0310680 | 4/1989 | European Pat. Off. . |
| 0362814 | 4/1990 | European Pat. Off. . |
| 0387016 | 9/1990 | European Pat. Off. . |
| 0387018 | 9/1990 | European Pat. Off. . |
| 0395885 | 11/1990 | European Pat. Off. . |
| 0423418 | 4/1991 | European Pat. Off. . |
| 0447072 | 9/1991 | European Pat. Off. . |
| 0501370 | 9/1992 | European Pat. Off. . |
| 4137427 | 11/1991 | Germany . |

OTHER PUBLICATIONS

W. Schroter, et al. "Taschenbuch Der Chemie" 1990, pp. 52 & 53.

Primary Examiner—Patrick J. Ryan
Assistant Examiner—Elizabeth Evans
Attorney, Agent, or Firm—Foley & Lardner

[57] ABSTRACT

As starting materials for substrates for optical storage disks, cycloolefin copolymers (COC) are produced by a polymerization process in which the polymerization is terminated at a point in time at which the molar-mass distribution $M_w/M_n$ is <2.0, or COC blends are produced which are composed of a first component having $M_w<30,000$ g/mol and $M_w/M_n \leq 2$, preferably <2, and a second component having $M_w>15,000$ g/mol and $M_w/M_n$ less than/equal to 4 and greater than/equal to 2. The substrate is produced by thermal deformation either of a single COC having a molar-mass distribution $M_w/M_n$ of <2 or of a blend composed of such a COC and one or more COCs having a molar-mass distribution of $2 \leq M_w/M_n < 4$ and $M_w$ of between 15,000 and 250,000 g/mol.

20 Claims, No Drawings

SUBSTRATE COMPOSED OF AT LEAST ONE CYCLOOLEFIN COPOLYMER FOR RECORDING MEDIA AND PROCESS FOR PRODUCING IT

BACKGROUND OF THE INVENTION

The present invention relates to a substrate composed of at least one cycloolefin copolymer for recording media and to a process for producing it.

To produce recording media, such as optical information carriers, for example, optical disks or compact disks, various layers composed of nitrides, oxides, rare earth/transition-metal alloys are sputtered onto a pre-stamped substrate composed of polycarbonate resin, polymethylmethacrylate, epoxy resin, polysulfone, polyether sulfone or polyether imide. The reproduction accuracy of the recorded information and the long-term stability of the information carrier are strongly material-dependent under these circumstances; the thermal dimensional stability and the birefringence of the substrate material, for example, affect the reproduction accuracy in a decisive way, while the moisture absorption of the plastic material affects the long-term stability of the physical properties of the recording layers quite substantially. The substrates are produced by injection-molding technology, the groove or pit matrix being transferred to the plastic substrates by means of an original (stamper). The fidelity of this copy to the master depends very strongly on the processability of the injection-molding material. It is known that polymeric materials which have a good flowability under the processing conditions also ensure a good imaging quality.

EP-A 0 310 680 describes a recording medium in the form of a magnetooptical storage disk (MOD) having a substrate composed of an amorphous ethylenetetracyclododecene copolymer which supports a magnetooptical recording layer composed of a quaternary, amorphous rare-earth/transition-metal alloy composed of Tb, Fe and Co, with Pt or Pd as further alloying components.

EP-A 0 387 016 discloses in Example 4 a magneto-optical recording layer composed of Te, Ge and Cr which has been sputtered onto a substrate composed of an amorphous copolymer of ethylene with 1,4,5,8-dimethano-1,2,3,4,4a,5,8,8a-octahydronaphthalene (designated DMON for short).

Other known substrate materials are polymer blends of polycarbonate and polystyrene and cycloolefin copolymers, such as are described in U.S. Pat. No. 4,614,778 and in EP-A 0 387 018, column 5, lines 5 to 24.

The structure of a storage disk (OD) for which the substrates of the invention are suitable is described in German Patent Application P 41 37 427, corresponding to U.S. application Ser. No. 07/974,856, the disclosure of which is hereby incorporated by reference.

The reproduction accuracy of the recorded information and the long-term stability are significantly affected by the plastic substrate used, that is to say by the processability of the raw material and the thermal stability of the substrate. The transfer of the groove matrix of the stamper to the substrate during the injection-molding operation is worth improving in the case of the plastic substrates used, which are composed of PC, PMMA and the hitherto known COC (cycloolefin(co)polymers). Inter alia, the rejection rate in the disk production could be reduced, accompanied by simultaneous increase in the quality of the structure transferred by the stamper matrix.

SUMMARY OF THE INVENTION

It is therefore an object of the present invention to provide an improved information recording medium.

Another object of the invention is to improve the recording and reproduction quality for optical recording media while maintaining the thermal dimensional stability, i.e., without losses in the mechanical and thermal properties of the substrates.

A further object of the invention resides in providing an improved process for producing optical information recording media.

In accomplishing the foregoing objects, there has been provided in accordance with one aspect of the present invention a substrate comprising at least one cycloolefin copolymer for recording media, wherein the cycloolefin copolymer has a molar-mass distribution $M_w/M_n <$ about 2 and a molecular weight of less than/equal to about 30,000 g/mol and has a glass transition temperature of from about 100° C. to 220° C. Preferably, the cycloolefin copolymer has a density of from about 1.01 to 1.08 g/cm$^3$, a refractive index from about 1.52 to 1.54 and a modulus of elasticity of from about 3 to 4 GPa and a yield stress of from about 30 to 75 MPa. According to preferred embodiments, the cycloolefin copolymer is a norbornene/ethylene copolymer or a tetracyclododecene/ethylene copolymer, or a blend of two or more of such copolymers.

According to another aspect of the present invention, there has been provided a process for producing a substrate for recording media comprised of at least one cycloolefin copolymer, comprising: polymerizing without ring opening from about 0.1 to 100% by weight, based on the total amount of the monomers, of norbornene or tetracyclododecene, and at least one monomer, selected from about 0 to 99.9% by weight, based on the total amount of the monomers, of a cycloolefin of the formula VII

in which n is an integer from 2 to 10, and from about 0 to 99.9% by weight, based on the total amount of the monomers, of at least one acyclic 1-olefin of the formula VIII

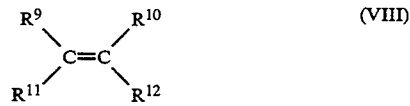

in which $R^9$, $R^{10}$, $R^{11}$ and $R^{12}$ are identical or different and are selected from hydrogen and a $C_1$-$C_8$-alkyl radical, at a temperature of from about −78° C. to 150° C. and at a pressure of from about 0.01 to 64 bar, in the presence of catalyst and a metallocene in the form of a catalyst solution, catalyst suspension or a supported catalyst; terminating the polymerization from about 10 to 60 min after the start of the polymerization; precipitating or suspending the polymerization medium in a liquid comprised of a ketone, alcohol, ester, amide or water; filtering the polymer; drying the filtered polymer; and processing the dried polymer thermoplastically to form disks at a temperature above about 210° C.

In accordance with still another aspect of the invention, there has been provided an improved optical information recording disk made according to the above-stated process.

Further objects, features and advantages of the present invention will become apparent to those skilled in this art from the detailed description of preferred embodiments that follows.

DETAILED DESCRIPTION OF PREFERRED EMBODIMENTS

The invention provides a substrate composed of at least one cycloolefin copolymer, wherein the cycloolefin copolymer has a molar-mass distribution $M_w/M_n$ of less than about 2 and a molecular weight $M_w$ of less than/equal to about 30,000 g/mol and has a glass transition temperature of about 120° to 220° C. Preferably, at the same time, the density of the cycloolefin copolymer is from about 1.01 to 1.08 g/cm², and the refractive index is from about 1.52 to 1.54. In a preferred embodiment of the invention, the modulus of elasticity of the cycloolefin copolymer is from about 3 to 4 GPa, and the yield stress is from about 30 to 75 MPa. Particularly preferred exemplary embodiments are composed of a norbornene/ethylene copolymer or a tetracyclododecene/ethylene copolymer.

In a further preferred aspect of the invention, two or more cycloolefin copolymers which have different molar masses and in which the glass transition temperatures are equal or do not differ from one another by more than about 20° C. are blended together. Expediently, a low-molecular-weight cycloolefin copolymer having a molecular weight of less than/equal to about 30,000 g/mol is combined as a first blending component with one or more higher-molecular-weight cycloolefin copolymers having a molecular weight equal to or greater than about 15,000 g/mol as a second or further blending component.

A process according to the invention for producing a substrate for recording media composed of at least one cycloolefin copolymer, which has been produced by polymerization without ring opening, is one wherein a cycloolefin of the formula VII or an acyclic 1-olefin of the formula VIII is polymerized in norbornene solution with the addition of a metallocene in the form of a catalyst solution, catalyst suspension or a supported catalyst, wherein a reaction termination of the polymerization is carried out about 10 to 60 minutes after the start of the polymerization, wherein the terminated polymerization medium is precipitated or suspended in a liquid composed of a ketone, alcohol, ester, amide or water and then filtered off, wherein the COC polymer filtered off is dried, and wherein the dried COC polymer is thermoplastically processed to form disks at a temperature above 210° C.

In the process, the polymerization is terminated at a point in time at which the molar-mass distribution is $M_w/M_n <$ about 2.0, in particular $M_w/M_n \leq$ about 1.7 or $M_w/M_n \leq$ about 1.4 and $M_w$ is less than about 30,000. In a variant of the process, the polymerization is terminated at a point in time at which the molar-mass distribution $M_w/M_n$ is $\geq$ about 2 and less than/equal to about 4.

The molecular mass of the COC polymer can be set to less than about 30,000 g/mol by metered addition of hydrogen, in which case the polymerization need not be limited in time.

In a further embodiment of the process, a COC polymer having a molar-mass distribution $M_w/M_n$ of < about 2 and at least one COC polymer having a molar-mass distribution of $\geq$ about 2 and less than/equal to about 4 is processed in solution or in the melt to form a polymer blend. In this case, for example, the COC polymer has a molar mass of about 700 to 30,000 g/mol and at least one further cycloolefin has a molar mass of about 15,000 to 250,000 g/mol.

The COC polymer produced in this way or the polymer blend is pressed, injection-molded or extruded to form disks.

The novel substrate is produced from a single cycloolefin copolymer or a blend of two or possibly more cycloolefin copolymers having very similar to identical glass transition temperatures, but different molar masses. The blending components are produced in turn by polymerization without ring opening (preferably by means of a catalyst and of metallocene as catalyst) of from about 0.1 to 100% by weight, based on the total amount of the monomers, of at least one monomer of the formula I, II, III, IV, V or VI

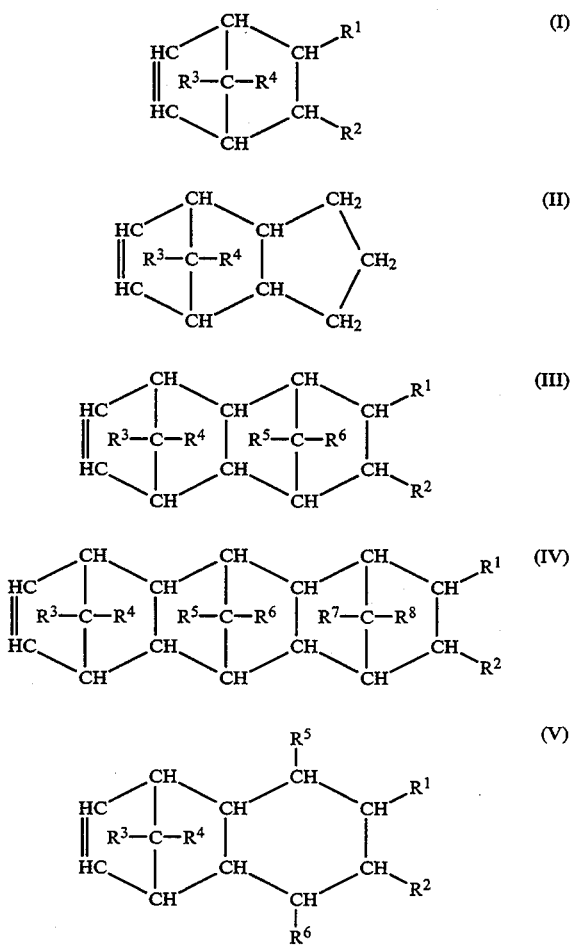

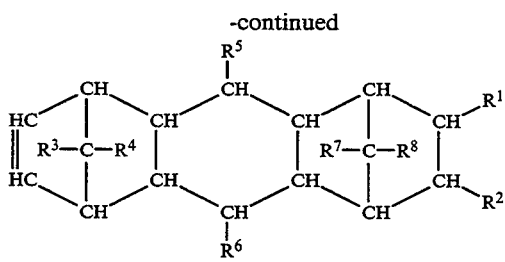

in which $R^1$, $R^2$, $R^3$, $R^4$, $R^5$, $R^6$, $R^7$ and $R^8$ are identical or different and are a hydrogen atom or a $C_1$–$C_8$-alkyl radical, it being possible for identical radicals in the different formulae to have a different meaning, 0 to about 99.9% by weight, based on the total amount of the monomers, of a cycloolefin of the formula VII

in which n is an integer from 2 to 10, and 0 to about 99.9% by weight, based on the total amount of the monomers, of at least one acyclic 1-olefin of the formula VIII

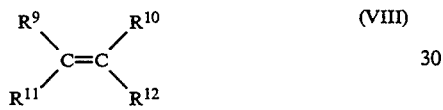

in which $R^9$, $R^{10}$, $R^{11}$ and $R^{12}$ are identical or different and are a hydrogen atom or a $C_1$–$C_8$-alkyl radical, at temperatures of from about −78° C. to 150° C. and at a pressure of from about 0.01 to 64 bar.

The COC substrate material ensures higher imaging quality during precision injection molding as a result of an improved flowability under processing conditions.

Surprisingly, it was found that low-molecular-weight, narrowly distributed COCs produced by the polymerization process according to the invention have an improved flowability in the melt compared with known COCs, without their thermal dimensional stability thereby being impaired. The COCs described result in improved imaging qualities during their processing to form optical disks or compact disks. In addition, blending experiments have shown, surprisingly, that markedly improved flowabilities can be achieved even with certain COC blends which contain COC components produced only in fractions and specially for the purpose. The COC blends likewise provide improved imaging qualities of the OD and CD substrates while maintaining the thermal dimensional stability.

The blends produce a multimodal gel permeation chromatogram, i.e., curves having at least two maxima are obtained. Molar-mass distributions of polymers are nowadays determined by GPC as a matter of routine. In this method, a dissolved polymer sample is separated in accordance with its hydrodynamic volumes, i.e., according to molecular sizes, not according to the molecular weight, by means of GPC columns (Elias "Makromoleküle" (Macromolecules), Vol. 1, 5th edition, Basel, 1990). The support in the GPC columns is a gel. The gels used in the case of organic solvents are usually crosslinked poly(styrenes). From the measured chromatogram, the molar-mass distribution $M_w/M_n$ is determined in addition to the mean molecular weights $M_w$, $M_n$ by means of a calibration with known substances.

Prerequisites for the GPC investigations are, inter alia, the absence of aggregates, i.e., of a molecular disperse solution of the sample, in the solvent and the separation without adsorption phenomena, which include the interaction with the column material. The GPC analyses mentioned were carried out with a Waters GPC 150-C apparatus using IR and UV detection and polyethylene as calibration standard for the columns of the apparatus.

The invention relates, on the one hand, to COCs having a narrow molar-mass distribution and, on the other hand, to COC blends of two or more components, which may likewise have narrow distributions, but do not necessarily have to have such distributions. Preferably, the COCs are composed of a norbornene/ethylene or tetracyclododecene/ethylene copolymer and have a thermal dimensional stability for a glass transition temperature range from about 100° C. to 220° C.

The preparation of COCs, in general, is well known in the art, for example, as exemplified by the processes described in European Patent Applications No. 0 485 893 and No. 0 501 370, the disclosures of which are hereby incorporated by reference. The essential properties of the polymers according to the invention can be summarized as follows:

the material is amorphous and has a glass transition temperature of between about 100° C. and 220° C.,
is colorless and transparent,
has a density of from about 1.01 to 1.08 g/cm³,
the refractive index is from about 1.52 to 1.54,
the water absorption at 23° C. and 85% relative humidity is less than about 0.04%,
the modulus of elasticity is from about 3 to 4 GPa,
the yield stress is from about 30 to 75 MPa,
the material is soluble in toluene, xylene, cyclohexane, exxsol, chloroform and diethyl ether,
the material is insoluble in water, alcohols, ketones (acetone), esters, amides (DMF, DMAC, NMP),
the material has chemical resistance to aqueous and concentrated acids such as HCl, $H_2SO_4$, and bases, such as NaOH or KOH.

A typical, essential property of the COC basic types is their low inherent birefringence, i.e., a low anisotropy of the molecular polarizability, and their resistance to hydrolysis.

The blends can be prepared in a melt or in solution. They each have favorable property combinations of the components for particular substrate applications.

In order to achieve melt properties favorable for the chosen application, a plurality of polymers according to the invention may also be blended with one another. The blends are composed of mixtures of different COCs which, however, have the same glass transition temperature or one which does not differ by more than only about 20° C. At least one low-molecular-weight component having an $M_w$ of between about 700 and 30,000 g/mol is combined with one or more higher-molecular-weight components having $M_w$ of ≧ about 15,000 g/mol. For the mean molecular weight $M_w$ of the higher-molecular-weight blending component, the upper limit is open, but a practicable limit is about 250,000 g/mol. The molecular weights are, as already described, determined by means of gel permeation chromatography and polyethylene standard. At the same time, a measure of the molecular weights is the viscosity number determined in accordance with DIN 51 562.

The GPC analysis yields diagrams having bimodal molecular-weight distribution. Low viscosity $\eta$ under processing conditions implies good flowability and, consequently, high precision in the reproduction of structures of the stamper in the pressing operation or of structures in the casting mold in the case of injection molding. The viscosity $\eta$ is dependent on the temperature and on the shear determined during the measurement by the frequency of a rotating disk between which disk and a further disk the sample to be measured is inserted. The viscosity $\eta$ for the pure cycloolefin copolymers according to the invention is, as is also the case for the COC blends according to the invention, in the region of:

$\eta <$ about $4 \times 10^3$ Pa.s at 270° C. and a frequency of 1 rad/s or $\eta < 2 \cdot 10^3$ Pa.s at 270° C. and a frequency of 10 rad/s.

For the molar-mass distribution $M_w/M_n$ of the blending components it is the case that, for the first component, they should be greater than/equal to about 1 and less than about 2.1, preferably less than 2, and for the second component they should be greater than/equal to about 2 and less than/equal to about 4. If the substrate is composed of a single cycloolefin copolymer, the molar-mass distribution $M_w/M_n$ is in the range about $1.1 \leq M_w/M_n < 2$.

The result is COC blends having very good flow properties which are particularly suitable for precision injection molding to produce substrates for optical recording materials, such as optical disks, compact disks, audio and video disks and the like.

EXAMPLES

The glass transition temperatures (Tg) specified in the following examples were determined by means of DSC (differential scanning calorimetry) with a heating rate of 20° C./min. For this purpose, the thermal analyses were carried out with a Perkin Elmer DSC7 instrument, the second heating curve being used. The molar-mass distribution ($M_w/M_n$) and the molecular weight ($M_w$) of the reaction products were determined by gel permeation chromatography in accordance with the above information.

Example 1

A clean and dry 1.5 dm³ polymerization reactor having a stirrer was flushed with nitrogen and then with ethylene and filled with 575 ml of an 85%-strength by volume toluenic norbornene solution.

The reactor was then kept at a temperature of 70° C. while stirring and a 3-bar ethylene overpressure was applied to the norbornene solution.

Then 20 cm³ of toluenic methylaluminoxane solution (MAO soln.) (10.1% by weight of methylalumuninoxane having a molecular mass of 1,300 g/mol according to cryoscopic determination) were metered into the reactor and the mixture was stirred for 15 minutes at 70° C., the ethylene pressure being kept at 3 bar by topping up. In parallel with this, 10 mg of fluorenylcyclopentadienyldiphenylcarbylzirconium dichloride were dissolved in 20 cm³ of toluenic methylaluminoxane solution (for concentration and quality see above) and preactivated by allowing to stand for 15 minutes. Then the solution of the complex was metered into the reactor. Polymerization was then carried out at 70° C. while stirring (750 rev/min), the ethylene pressure being kept at 6 bar by topping up.

At an interval of 15 min after adding the catalyst, four 50 ml samples were collected from the reaction medium via a lock, these samples being denoted as samples A to D in Table 1 below. $M_w$, $M_w/M_n$ and the glass transition temperature of these samples were determined.

The samples were quickly drained into a stirred vessel in which 100 cm³ of isopropanol were provided as stopper to effect the reaction termination of the polymerization. The mixture was added dropwise to 2 dm³ of acetone, stirred for 10 min and the suspended polymeric solid material was then filtered off.

The polymer filtered off was then added to 2 dm³ of a mixture of two parts of 3N hydrochloric acid and one part of ethanol and this suspension was stirred for two hours. The polymer was then again filtered off, washed with water until neutral and dried for 15 hours at 80° C. and 0.2 bar.

The properties of the samples are shown in Table 1. In this table, sample A to sample D clearly show the development of the molecular weight $M_w$ (increase) and the molar-mass distribution. (widening) with progressive reaction time. If these values are plotted against the reaction time, it is possible to determine from the curve thus obtained in each case the point in time at which the polymerization has to be terminated in order to maintain the specified conditions for $M_w/M_n \leq$ about 2 and $M_w \geq$ about 30,000 g/mol for the preferred first blending component.

The second component having about $2 \leq M_w/M_n \leq 4$ and $M_w \geq$ about 15,000 g/mol can be produced either analogously to the first by terminating the polymerization with the desired molecular weight or with the aid of a controlled hydrogen regulation, which means that, immediately after adding the catalyst, a certain amount of hydrogen is supplied to the reaction via a lock. The hydrogen-to-ethene ratio must be kept constant during the reaction in order to achieve a $M_w/M_n$ close to 2. The higher the hydrogen-to-ethene ratio is, the lower the molar mass of the COCs turns out to be. In this case, too, a desired molecular weight can be selected with the aid of a calibration.

TABLE 1

| Sample | Time after adding catalyst (min) | Glass transition temperature $T_g$ (°C.) | $M_w$ (g/mol) | $M_w/M_n$ |
|---|---|---|---|---|
| A | 15 | 162 | $2.06 \times 10^4$ | 1.7 |
| B | 30 | 161 | $3.25 \times 10^4$ | 2.2 |
| C | 45 | 159 | $3.95 \times 10^4$ | 2.2 |
| D | 60 | 158 | $4.57 \times 10^4$ | 2.5 |

The samples A to D serve only to determine the curves $M_w/M_n$ and $M_w$ as a function of the reaction time, i.e., of the time from the addition of the catalyst to the reaction termination. The samples A to D are not, however, by any means explicitly selected cycloolefin copolymers which can be used individually or as first blending component in a blend. From Table 1 it can be inferred that, with the polymerization conditions chosen in this example, a reaction time of up to about 15 min provides a suitable COC which can be used individually or as first blending component in a blend. The COCs produced in the range specified by the samples B to D are in each case suitable as second blending component in a blend.

Example 2

The procedure adopted was analogous to Example 1, the following process parameters being changed:
Reaction temperature: 20° C.
Amount of catalyst: 240 mg
Sample collection: 10-minute intervals.

The properties of the samples are shown in Table 2. Analogous comments as in relation to samples A to D of Example 1 apply in relation to the $M_w/M_n$ and $M_w$ curves. In order to obtain a suitable COC, the reaction should be terminated after less than 14 min. The COCs produced in the range covered by the samples F to H are in each case suitable as second blending component in a blend.

TABLE 2

| Sample | Time after adding catalyst (min) | Glass transition temperature $T_g$ (°C.) | $M_w$ (g/mol) | $M_w/M_n$ |
|---|---|---|---|---|
| E | 10 | 140 | 1.67 × 10⁴ | 1.1 |
| F | 20 | 143 | 2.83 × 10⁴ | 1.1 |
| G | 30 | 143 | 3.99 × 10⁴ | 1.1 |
| H | 40 | 144 | 4.88 × 10⁴ | 1.1 |

Example 3

54 g of a polymer were prepared analogously to Example 1, the following polymerization conditions being chosen as a departure from Example 1:
concentration of the norbornene solution used: 27%
ethylene pressure: 3 bar
catalyst: fluorenylcyclopentadienlydiphenylcarbylzirconium dichloride;
amount of catalyst: 10 mg;
amount of methylaluminoxane solution: 20 ml;
reaction time: 30 min.

The polymer obtained had a glass transition temperature of 141° C., an $M_w = 1.63 \times 10^5$ and a molar-mass distribution $M_w/M_n = 2.0$.

Example 4

The polymerization was carried out analogously to Example 1. The catalyst solution used was 40 cm³ of MAO solution containing 500 mg of rac-dimethylsilyl-bis(1-indenyl)zirconium dichloride. Polymerization was carried out for 30 min at 6° C. and 4 bar ethylene overpressure. 3.8 g of product were obtained. The glass transition temperature was 122° C. A molecular weight $M_w$ of 2,540 g/mol and a molar-mass distribution $M_w/M_n$ of 1.15 were found by GPC (analogously to Examples 1 and 2).

Example 5

The polymerization was carried out analogously to Example 4. Polymerization was carried out for 10 min at 20° C. and 6 bar ethylene overpressure. 10.4 g of material were isolated. The glass transition temperature was 142° C. The molecular weight $M_w$ was 7,240 g/mol and the molar-mass distribution $M_w/M_n$ was 1.10.

Example 6

2.4 g of a polymer in accordance with Example 3 (second blending component of the blend) and 0.6 g of a polymer in accordance with Example 4 (first blending component of the blend) were dissolved in 147 g of toluene and then precipitated by slowly adding dropwise to acetone. The precipitated material was then dried for one day at 80° C. in a drying oven. The polymer blend obtained in this way had a glass transition temperature of 138° C. in the DSC measurement with a heating rate of 20° C./min.

Example 7

48 g of a polymer in accordance with Example 3 (second blending component of the blend) and 12 g of a polymer in accordance with Example 5 (first blending component of the blend) were mixed and kneaded for 15 minutes with a rotary speed of 60 revolutions/minute at 225° C. in a Haake "Rheomix 600 measuring kneader". The blend obtained in this process was transparent and had a glass transition temperature of 141° C. in the DSC measurement with a heating rate of 20° C./min.

Example 8

Round pressed disks having a diameter of 25 mm were produced from the materials in accordance with Examples 3, 6 and 7 by pressing for 15 minutes at 225° C. All the pressed plates were colorless and transparent. For the purpose of rating and of comparing the processability of these materials, the pressed disks obtained in this way were used to determine the viscosity $n$. The apparatus used for this purpose was a "Rheometrics Dynamic Spektrometer RDS 2". The measurements were carried out in the "disk-disk" geometry at 270° C. and for two frequencies. The measurement results are listed in Table 3.

TABLE 3

| Sample designation according to Example No. | Frequency 1 (1 rad/s) (Pa · s) | Frequency 2 (10 rad/s) (Pa · s) |
|---|---|---|
| 3 | 6.41 × 10³ | 2.63 × 10³ |
| 6 | 2.47 × 10³ | 1.09 × 10³ |
| 7 | 2.67 × 10³ | 1.15 × 10³ |

What is claimed is:

1. A substrate comprising at least one cycloolefin copolymer for recording media, wherein the cycloolefin copolymer has a molar-mass distribution $M_w/M_n < 2$ and a molecular weight of less than/equal to 30,000 g/mol and has a glass transition temperature of from 100° C. to 220° C.

2. A substrate as claimed in claim 1, wherein the cycloolefin copolymer has a density of from 1.01 to 1.08 g/cm³ and a refractive index from 1.52 to 1.54.

3. A substrate as claimed in claim 2, wherein the cycloolefin copolymer has a modulus of elasticity of from 3 to 4 GPa and a yield stress of from 30 to 75 MPa.

4. A substrate as claimed in claim 1, wherein the cycloolefin copolymer comprises a norbornene/ethylene copolymer.

5. A substrate as claimed in claim 1, wherein the cycloolefin copolymer comprises a tetracyclododecene/ethylene copolymer.

6. A substrate as claimed in claim 1, comprising a blend of two or more cycloolefin copolymers having different molar masses and having respective glass transition temperatures of the cycloolefin copolymers which do not differ from one another by more than 20° C.

7. A substrate as claimed in claim 6, comprising a blend of a low-molecular-weight cycloolefin copolymer having a molecular weight of less than 30,000 g/mol, as first blending component with one or more higher-molecular-weight cycloolefin copolymers having a molecular weight equal to or greater than 15,000 g/mol, as second or further blending component.

8. A substrate as claimed in claim 7, wherein the first blending component has a molar-mass distribution $M_w/M_n$ in the range of from 1 to less than 2 and the second or further blending component has a molar-mass distribution $M_w/M_n$ in the range greater than/equal to 2 and less than/equal to 4.

9. A substrate as claimed in claim 6, wherein the substrate material has a viscosity $\eta$ less than $4 \times 10^3$ Pa.s for a frequency of 1 rad/s at a temperature of 270° C.

10. A substrate as claimed in claim 6, wherein the substrate material has a viscosity $\eta$ less than $2 \times 10^3$ Pa's for a frequency of 10 rad/s at a temperature of 270° C.

11. A substrate as claimed in claim 1, in the form of a circular disk.

12. A process for producing a substrate for recording media comprised of at least one cycloolefin copolymer, comprising: polymerizing without ring opening from 0.1 to 100% by weight, based on the total amount of the monomers, of norbornene, and at least one monomer, selected from 0 to 99.9% by weight, based on the total amount of the monomers, of a cycloolefin of the formula VII

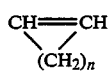

(VII)

in which n is an integer from 2 to 10, and from 0 to 99.9% by weight, based on the total amount of the monomers, of at least one acyclic 1-olefin of the formula VIII

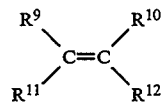

(VIII)

in which $R^9$, $R^{10}$, $R^{11}$ and $R^{12}$ are identical or different and are selected from hydrogen and $C_1-C_8$-alkyl, at a temperature of from $-78°$ C. to 150° C. and at a pressure of from 0.01 to 64 bar, in the presence of catalyst and a metallocene in the form of a catalyst solution, catalyst suspension or a supported catalyst; terminating the polymerization from 10 to 60 min after the start of the polymerization; precipitating or suspending the polymerization medium in a liquid comprised of a ketone, alcohol, ester, amide or water; filtering the polymer; drying the filtered polymer; and processing the dried polymer thermoplastically to form disks at a temperature above 210° C., wherein the polymerization is terminated at a point in time at which the molar-mass distribution of the cycloolefin copolymer $M_w/M_n$ is $<2$ and $M_w$ is less than 30,000 g/mol.

13. A process as claimed in claim 12, wherein $M_w/M_n \leq 1.7$ or $M_w/M_n \leq 1.4$.

14. A process as claimed in claim 12, wherein the molar mass of the COC polymer is set to $<30,000$ g/mol by means of hydrogen addition.

15. The process as claimed in claim 12, wherein a COC polymer having a molar-mass distribution $M_w/M_n$ of $<2$ and at least one COC polymer having a molar-mass distribution of $\geq 2$ and less than/equal to about 4 is processed in solution or in a melt to form a polymer blend.

16. A process as claimed in claim 15, wherein the two or more polymers are dissolved in toluene at room temperature, precipitated in a ketone and then dried and wherein the transparent polymer blend obtained in this way is processed thermoplastically to form disks.

17. A process as claimed in claim 15, wherein the solvent for the two or more polymers is decahydronaphthalene at a temperature of about 130° to 140° C.

18. A process as claimed in claim 15, wherein two or more polymers are mixed together and are kneaded at a temperature of 220° to 230° C. to form a transparent polymer blend.

19. A process as claimed in claim 12, wherein the polymer is pressed, injection-molded or extruded to form disks.

20. An information disk comprised of a polymer disk produced according to the process of claim 12.

* * * * *

UNITED STATES PATENT AND TRADEMARK OFFICE
CERTIFICATE OF CORRECTION

PATENT NO. : 5,439,722
DATED : August 8, 1995
INVENTOR(S) : BREKNER et al.

It is certified that error appears in the above-indentified patent and that said Letters Patent is hereby corrected as shown below:

Column 12, Claim 15, line 24, please delete "about".

Claim 17, line 33, after "of" delete "about".

Signed and Sealed this

Twenty-first Day of May, 1996

Attest:

BRUCE LEHMAN

*Attesting Officer*    *Commissioner of Patents and Trademarks*